Oct. 5, 1943.   J. W. WHITE ET AL   2,331,258
TUBE CLAMP
Filed Feb. 9, 1942
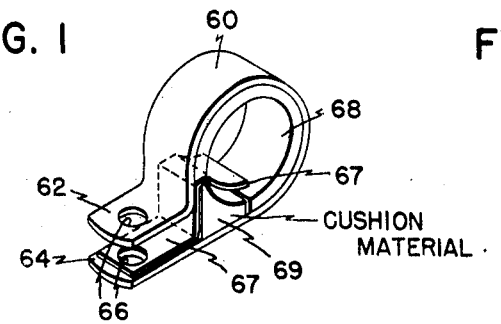
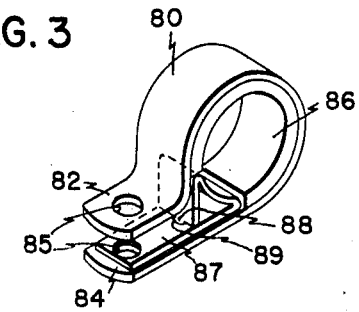
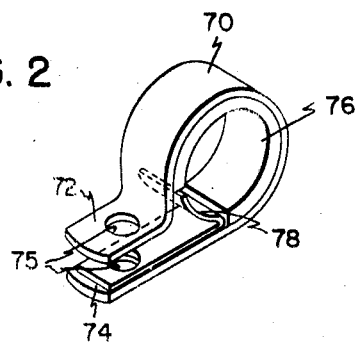
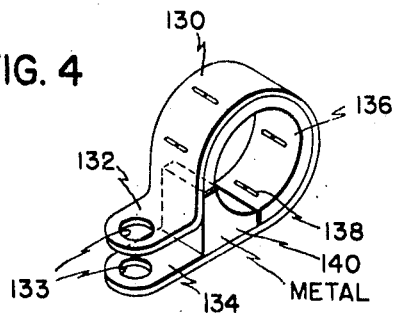
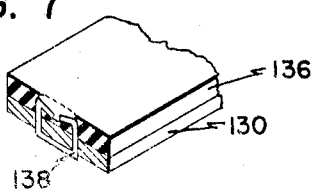
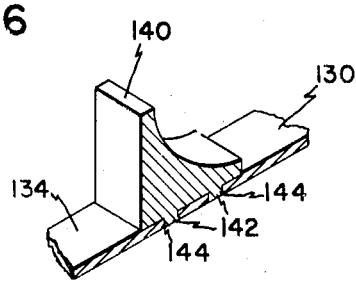
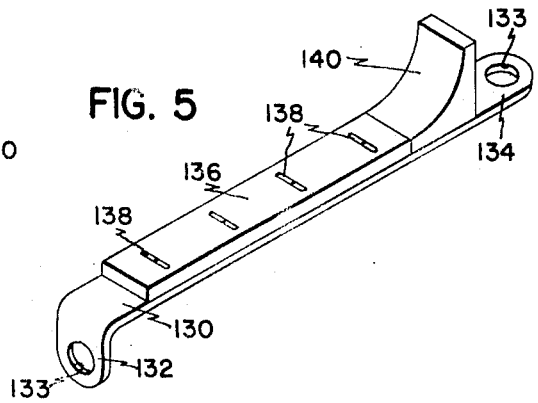
INVENTOR.
JOHN W. WHITE &
BY   ROBERT R. HARRISON
H. W. Brelsford
ATTORNEY Patented Oct. 5, 1943

2,331,258

UNITED STATES PATENT OFFICE 2,331,258

TUBE CLAMP

John W. White and Robert R. Harrison, North Hollywood, Calif., assignors, by mesne assignments, to Bendix Aviation, Ltd., North Hollywood, Calif., a corporation of California Application February 9, 1942, Serial No. 429,964

7 Claims. (Cl. 174—40)

This invention relates to holders for conduits and more particularly to those having support for a conduit in all quadrants of a circular shape. This application constiutes a continuation in part of a prior application, Serial No. 387,210, filed April 7, 1940.

The requirements for airplane use are most stringent, and although our conduit holders are applicable to any type of vehicle, they are designed for use in aircraft and will be described with reference to airplane usage. The first requirement of a conduit holder is that it must securely hold the conduit to the support to which the conduit holder is fastened. There is often intense vibration and elastic structural movement in airplanes and if a plain metal band were used to secure a conduit to a support it would wear and gouge the conduit rendering it unserviceable. This fact has necessitated the cushioning of many metal holders or clamps.

A resilient material is best suited for this purpose so that a constant gripping of the conduit is produced. Rubber is the most satisfactory material, including synthetic rubbers as well as the natural rubber. Since synthetic rubbers are sometimes not called rubber, the term "rubberlike material" will be used in this application to include natural rubber, synthetic rubber and other materials having physical properties similar to rubber.

A tube or conduit holder must also act to ground the conduit to prevent a static potential from building up. As an airplane travels through the air it picks up the static charge of bodies of air or clouds and the airplane becomes a charged body. Any member which is relatively insulated from the airplane itself may have a different potential as the airplane takes on or loses charges in the surrounding air or clouds. The fact that there is not a perfect flow of static charge even along metals that are good conductors, aggravates this condition. If this potential is great enough the electrons will arc across any intervening non-conductor to eliminate this difference in potential. Such arcing is undesirable as a fire hazard and because it causes radio interference by giving off electro-magnetic waves which interfere with radio transmission and reception.

A conduit in an airplane might be grounded at its ends to the airplane, but if it were insulated by rubber cushioned conduit holders along its length, the central portion of the conduit might well be at a higher or lower potential than the airplane due to inefficient conduction of static charges. Arcing might then develop and cause trouble. Thus a major requirement of all conduit holders is that they ground the conduit to the airplane or other vehicle to which they are attached. Thus where rubber or another nonconducting material is used as a cushioning element, conducting means must be provided to ground the conduit holder.

A common type of tube clamps or holder for conduits employs a strip of metal wrapped around a conduit or tube and the ends of the strip fastened together and to a supporting structure. Such tube clamps contact only about three-fourths of the periphery of round tubes and leave the other quadrant unsupported. Often it is necessary to tighten the loop severely to secure the conduit to its support. In such instances a thin-walled tube might be crushed out of shape and its operation thus impaired. The present invention, however, provides a tube clamp which supports a conduit or tube on its entire periphery thereby eliminating any tendency to crush the tube.

It is therefore an object of this invention to provide a holder for conduits which supports a conduit on its entire periphery.

Another object is to provide conduit holders which will hold thin-walled conduits tightly but without crushing or deforming them.

Another object is to provide a conduit holder with a cushioning element to prevent injury to the conduit.

Still another object is to provide cushioned conduit holders which transmit and equalize static charges between conduits held by them and the support to which they are fastened.

In the drawing forming a part of this specification:

Figure 1 is an isometric view of a rubber cushioned conduit holder having a corner block of cushion material, particularly adapted for use with thin-walled conduits;

Figure 2 is an isometric view of a rubber cushioned holder wherein the conductor tag is bent to support the conduit in the closure sector of the holder;

Figure 3 is an isometric view of a rubber cushioned holder having the conductor tag formed in a rigid shape to support a conduit in the closure sector of the holder;

Figure 4 is an isometric view of a conduit holder having a supporting block of conductor material fastened to the metal band at the fastening sector and having a rubber cushioning element stapled to the band;

Figure 5 is an isometric view of the holder of Figure 4 before being bent into final form;

Figure 6 is a detail view of the supporting block in section showing the manner in which it is secured to the metal band; and Figure 7 is a section through the conduit holder of Figure 5 showing the method of stapling the rubber cushion.

Referring to Figure 1 a metal band 60 is formed in a curved shape and has ends 62 and 64, each of which has a hole 66 therethrough. A cushion sheet of rubber-like material 68 is bonded to the strip 60. A corner block 69 of rubber-like material fills the corner at the ends 62 and 64, and is preferably bonded to the part of the strip 60 having the end 64. A conductor tag 67 is suitably secured to the end 64 and is bent upwardly and around the corner block 69 so as to contact and ground any conduit held by the holder.

A conduit holder having a corner support at the tangential portions of the strip is ideally suited for holding thin-walled tubes or conduits. Many electrical conduits, for example, are extremely thin-walled, and if they were subjected to gripping pressure by a conduit holder having out-of-round portions they would be deformed and probably crushed.

The cushion 68 and the corner block 69 are preferably of a rubber-like material bonded to the aluminum in a manner well known in rubber art. Since the metals used in aircraft work are the light metals, such as aluminum, the cushion is preferably bonded in accordance with the teachings of United States Patents 2,147,620 and 2,227,991. This method comprises briefly sandblasting the metal, applying a "primer" coat, applying uncured rubber-like material, and curing the rubber-like material, which causes it to adhere with a strong bond to the metal. The cushion 68 is preferably formed of sheet material, and the corner block may be a length of an extruded shape having the section shown.

The conduit holder of Figure 2 is also of the type having a corner support in the corner formed by the tangential portions of the metal strip. A metal strip 70 is formed similarly to strip 60 of Figure 1, and has ends 72 and 74, each having a hole 75 therethrough. A cushion element 76 of rubber-like material is bonded to the metal strip 70, as in Figure 1, but covers only the circular portion of metal strip 70. A conductor tag 78 is suitably secured to one of the ends 72 or 74 of the metal strip 70, and the inner end is bent in a circular form to fill the missing quadrant of the circle at the ends 72 and 74. The material of the tag 78 may be of very stiff material to act as a support to the conduit in the corner which it fills as well as a static charge conductor, or the tag 78 may be of light material to act as a conductor only.

The conduit holder of Figure 3 is similar to that of Figure 2, except that the conductor tag forms a more rigid corner support. A metal strip 80 is formed similarly to strip 60 of Figure 1, and has ends 82 and 84, each of which has a hole 85 therethrough. A cushion element 86 is bonded to the strip 80, as in Figure 1, but covers only the circular portions of strip 80. A conductor tag 87 is suitably attached to end 84 of strip 80 and a right triangle is formed on the inner end by bending the metal upwardly in circular shape and then bending the end vertically downwardly. The hypotenuse of the right angle triangle is roughly a quadrant of the same circle formed by the circular portion of the metal strip 80. An ear 88 on the bottom edge of the vertical part of tag 87 fits in a hole 89 in the horizontal part of tag 87 and rigidly secures the triangle formed on the inner end of the tag 87.

The conduit holder of Figure 3 is an inexpensive and efficient holder for conduits requiring corner support because of wall thinness. The corner support and the conductor element are embodied in one light, inexpensive, easily manufactured element, resulting in a particularly desirable construction.

Still another embodiment of our invention is shown in Figure 4, and shows several features applicable to any conduit holders. One feature includes the use of a supporting corner block of conductor material, and the other includes the use of staples as a means of securing a cushioning element to a metal strip. A metal strip 130 has its middle portion bent to a circular shape with tangential portions adjoining this shape. One end is bent at right angles to the tangential portion, forming a perpendicular end 132 parallel to the other tangential end 134. Co-axial holes 133 are formed in each end through which means may be inserted to secure the strip 130 to a support. A cushion element 136 is secured to strip 130 by staples 138 and covers the part of the strip 130 formed in a curved shape. A corner block 140 is secured to the tangential end 134 of strip 130 to fill the corner formed by the two tangential portions of strip 130. This corner block is preferably cast and of light weight metal, such as aluminum, to act as a conductor between a supported conduit and metal strip 130.

Figures 5, 6, and 7 show the details of construction of the holder. The metal strip 130 is first cut out of sheet metal, and end 132 is bent at right angles to the rest of the strip, as shown in Figure 5. Corner block 140 is next secured to strip 130 by inserting integral ears 142 (Figure 6) into punched holes 144 in strip 130, and riveting over the ends of ears 142. Cushion 136, of rubber-like material, is next stapled to strip 130. This is shown in detail in Figure 7, and it will be noted that the staples 138 are imbedded in the cushion 136 so as not to touch and injure any conduit held by the cushion 136. In addition to staples, the cushion 136 may be cemented to the strip 130 to prevent buckling of the cushion 136 when the unit as a whole is bent into final form as shown in Figure 4. The cement may be loosened by the effect of oil and gasoline, after the holder is in use, but since the staples will hold cushion 136 in any event, loosening of the cement will be of no importance while the holder is in use.

The conduit holder of Figure 4, just described, is of particular use for large thin-walled tubes. The metal block which acts as a conductor could be used on any holder using any suitable means to retain the cushion element. Likewise, staples may be used as an oil and gasoline resistant fastener to cushions regardless of the type of conductor used in conjunction with it.

Although we have described our invention with relation to particular embodiments thereof, we do not intend to limit our invention to the forms described nor otherwise except by the terms of the following claims.

We claim:

1. In a tube clamp adapted to secure a tube to a support, a strip of metal formed in a loop having tangential ends forming a corner, a cushion placed on the inside surface of said loop, and a corner support having a general shape to complete the loop shape of the strip placed in the loop at the joining of the ends of the strip, said corner being adapted to electrically ground any conduit to the strip.

2. A tube clamp adapted to secure a tube to a support comprising a strip of metal having its central part formed in a partially complete circle with one end completely tangential with a hole therein, and the other end being generally tangential with a terminal portion normal to said tangential portion and formed with a hole adapted to be aligned with the hole in the other end, a cushion of rubber-like material secured to the inside of the curved part of the strip, a corner block of rubber-like material secured to one end to complete the circular shape and to fill the corner formed by the tangential portions of the ends of the strip and having its surface matching the surface of the cushion, and a conductor tag secured to said strip and contacting the inside face of the cushion to electrically ground a tube held by said clamp to said strip.

3. A tube clamp adapted to secure a tube to a support comprising a strip of metal having its central part formed in a partially complete circle with ends tangential thereto forming a corner, a cushion secured to the inside of the curved part of the strip, a corner block of cushion material secured to one end to complete the circular shape and to fill the corner formed by the tangential end portions of the strip, and a conductor tag secured to said strip and contacting the inside face of the corner block to ground to said strip a tube held by the clamp.

4. A tube clamp adapted to secure a tube to a support comprising a strip of metal having its central part formed in an arc with ends tangential thereto forming a corner, a cushion of rubber-like material on the inside face of the curved part of the metal strip, a conductor tag of stiff metal secured to one end and protruding inwardly toward the cushion, the inner end of the tag being bent in a curved form to complete the arc in the sector of the corner to support and to ground a tube to said strip.

5. A tube clamp adapted to secure a tube to a support comprising a strip of metal having its central part formed in a partially completed circle with ends tangential thereto, a cushion of resilient material on the inside face of the curved part of the metal strip, a metal conductor tag secured to one end of the strip and protruding inwardly toward the cushion, the inner end of the tag being formed in a right triangle to fill the corner formed by the end portions, the hypotenuse of the triangle being curved to complete the circle formed by the inner surface of the cushion, and the short leg of the triangle having an ear fitting a hole on the other leg of the triangle, said tag contacting a tube to support it and ground it to said strip.

6. A tube clamp adapted to secure a tube to a support comprising a metal strip having its central portion formed in a partially complete circle with adjoining portions tangential and at right angles to each other, means to tighten the metal to constrict the circle, a cushion on the inside curved face of the circle, and a metal corner block in the corner formed by the tangential portions of the strip, having its inner surface flush with the inner surface of the cushion and secured to one of the tangential portions of the strip, said corner block supporting a tube and grounding a tube to said strip.

7. A tube clamp comprising a loop of metal having one end completely tangential with a hole therein and the other end substantially tangential with a terminal portion normal to the tangent with a hole therein adapted to be aligned with the other hole, said tangential ends forming a corner when drawn together, a cushion on the inner face of said loop, and a corner support in said loop at the joining of the tangential ends, said corner support having a surface flush with the inner surface of said cushion so that a tube may be held along its entire periphery.

JOHN W. WHITE.
ROBERT R. HARRISON.